3,701,727
TWO-STAGE AEROBIC AND FUCULTATIVE
WASTE TREATMENT
Richard A. Kormanik, Milwaukee, Wis., assignor to Rex Chainbelt Inc., Milwaukee, Wis.
Filed July 19, 1971, Ser. No. 163,925
Int. Cl. C02c 1/02
U.S. Cl. 210—14      2 Claims

ABSTRACT OF THE DISCLOSURE

A biodegradable waste is treated aerobically by high-rate aeration and mixing in a first basin for a critical period followed by low-rate aeration and mixing in the upper zone of a second basin and from which the effluent is withdrawn. The solids which settle to the lower zone decompose under anaerobic conditions and the liquid decomposition products are treated aerobically as they more upwardly from the lower into the upper zone. The second basin operates as a modified facultative lagoon.

BACKGROUND OF THE INVENTION

The field of the invention is the biological treatment of wastes by lagooning.

The prior art includes the use of high-rate aeration in special situations where the effluent of a treatment plant or a waste is not quite in condition for discharge into a stream or lake. The prior art also includes aerated lagoons.

A lagoon itself is generally formed naturally and with some earth moving to provide inexpensively a large, shallow basin. By definition an areated lagoon is one with an aerobic environment wherein the oxygen is supplied by artificial means. The oxygen and mixing requirements of the system are usually satisfied with the use of mechanical or diffused aeration. An aerated lagoon can be further defined as an aerobic lagoon or a facula-tive lagoon. In an aerobic lagoon the mixing level is maintained by the aeration equipment in the lagoon so that all solids are kept in suspension.

In a facultative lagoon the waste is treated aerobically in its upper zone and the effluent from the upper zone includes relatively low concentration of suspended solids. In the lower zone of the facultative lagoon the settled solids decompose anaerobically. The liquid products of such decomposition are certain weak acids of lower density which upon entering the upper zone are treated aerobically. Such products are thus a relatively minor but significant source of soluble BOD. Accordingly, in a facultative lagoon the degree of mixing must be low enough to allow solids to settle but high enough to distribute the dissolved oxygen and soluble BOD throughout the upper zone.

In both types of lagoon the aeration which is necessary to satisfy the oxygen requirements will also provide the required degree of mixing. With a proper inlet arrangement, the aerated lagoon can then be considered completely mixed.

In comparing the two types of aerated lagoons, each has distinct advantages as well as disadvantages. Since the degree of mixing in the aerobic lagoon is high enough to keep solids in suspension, the detention time required to attain the desired removal of soluble BOD is significantly less than that of a facultative lagoon. The reduction is detention time which may be thus effected only occurs because a significantly higher equilibrium level of volatile suspended solids (biological mass) is maintained. The disadvantages of the aerobic lagoon are two-fold. First, the horsepower required for mixing in the aerobic lagoon is usually significantly higher than that required for satisfying the oxygen requirements. Therefore, much more horsepower is required in the aerobic lagoon than in an equivalent facultative lagoon. Secondly, since a relatively high level of volatile solids are kept in suspension, voltatile solids will remain in suspension in the effluent. In essence, the aerobic lagoon removes soluble BOD from the influent but produces an effluent BOD which carries all of the remaining volatile suspended solids. Therefore, in order to remove these solids and reduce the suspended BOD, a clarifier is required and a distinct economic disadvantage results.

The facultative lagoon has the advantages of lower horsepower requirements and a low effluent volatile suspended solids level because of the settling of such solids which is provided for. However, the required detention times are much longer.

SUMMARY OF THE INVENTION

It has been found and confirmed mathematically using established formulas based on observed results, that by conducting the biological growth phase of the aerobic treatment stage at a high rate and for a critical period, and by conducting the remaining treatment period in a separate basin, a very large increase in overall efficiency of the treatment process is provided, for example, as would allow a one-third reduction in the size of the lagoon and cost of treating a given waste flow.

This improvement is attributed to several interdependent considerations. The first is that a high level of mixing and aeration is required for the first phase and can be provided in the first basin where a high level of mixing is also required to prevent any settling of solids.

According to the present invention, for a given flow of a waste of certain soluble BOD levels and volatile suspended solid content within limits there is, with only a few exceptions, a unique combination of high-rate aeration for a certain period followed by facultative treatment which together require less artificial aeration and less land area than required for conventional facultative lagooning of the same waste flow. These difference are expressed in terms of horsepower and detention time requirements and as indicated graphically show that there is one certain detention time for each stage which together provide several times the capacity of a conventional facultative lagoon. It is also of importance that the apparatus and process of the present invention does not require or involve any return of the flow from any one to another location in the system.

DESCRIPTION OF THE PREFERRED EMBODIMENT

Figure 1:
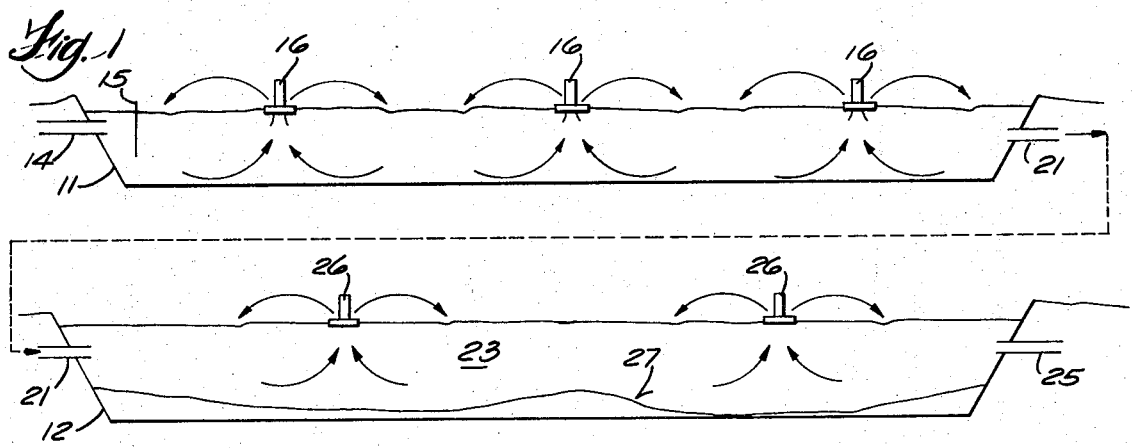
FIG. 1 is a diagramamtic cross-section of the two basins or lagoons for carrying out the present invention.

Lagoons 11 and 12 diagrammatically shown in the drawings are of suitable horizontal dimensions. Lagoon 12 is deeper and in the practice of the invention will generally be approximately the same size as lagoon 11. The influent line 14 opens into lagoon 11 which may include a suitable inlet distribution device such as the baffle 15. The floating mechanical aerators 16 are strategically placed in lagoon 11 and are of a size and capacity which provide for complete mixing of the waste in the lagoon. This complete mixing includes maintaining the contents of the lagoon in motion over the entire bottom of the lagoon to prevent any appreciable settling of the suspended solids of the waste. The connection of the "bio-liquor" line 21 with lagoon 11 is opposite the location of the influent line 14. Line 21 opens into the upper zone 23 of lagoon 12 at one end thereof. Effluent line 25 from the upper zone 23 of lagoon 12 is located opposite the line 21. Lagoon 12 is provided with a number of mechanical aerators 26 which are placed and of a size to provide a lower degree of mixing. Mechanical aerators 16 and 26 may be of the same size. In most cases the lower degree of aeration and mixing is suitably provided by the greater spacing of aerators 26. This spacing and the greater depth of lagoon 12 provides relatively quiescent conditions in the lower zone 27 of the lagoon for the settled solids undergoing anaerobic decomposition.

Mechanical aerators 16 and 26 may be of a well known type which are individually supported by floats and can be placed and secured by cables at the desired locations in the lagoons. Each such aerator includes an electric motor which drives a submerged propeller operating in a draft tube having a lower submerged opening for receiving the flow and a circular discharge opening above the float. The radial discharge of the flow with a vertical component effects contact with the air and also entrains some oxygen with the flow as it falls back into the basin. Aerators of the pier-mounted type or diffused aeration apparatus may also be used.

According to the invention, the relative sizes of lagoons 11 and 12 and the degree of aeration and mixing provided in each of the two lagoons are critically selected to provide the maximum biological efficiency of the waste treatment process.

As is known, the rate of soluble BOD removal from any completely mixed aerobic biological system is related to the quantity of active microorganisms present and the quantity of soluble BOD present or remaining. Considering lagoon 11 and the upper zone of lagoon 12 as first and second completely mixed basins and having in mind that the contents and effluent of the first basin and the influent of the second basin are the same, the foregoing may be separately expressed as follows for the first and second basins:

$$So - Si = kt_1 X_1 Si$$

and $$Si - Se = kt_2 X_2 Se$$

where:

$So$, $Se$ and $Si$ respectively are the soluble BOD levels of the influent to the first basin, the intermediate "bio-liquor" and the effluent of the second basin
$X_1$ and $X_2$ are the average volatile suspended solids under aeration in the first and second basins, respectively
$k$ is the BOD removal rate coefficient
$t_1$ and $t_2$ are the detention times for the first and second basins, respectively These equations may be rearranged as follows:

$$t_1 = \frac{So - Si}{k Si X_1}$$

and $$t_2 = \frac{Si - Se}{k Se X_2}$$

Another equation for the values of $t_1$ and $t_2$ may be derived from Equation (10-7) at page 123 of the authoritative book Industrial Water Pollution Control by W. W. Eckenfelder and published in 1966. This equation is essentially a material balance expressed as "solids-in plus solids-synthesized less solids-removed by auto-oxidation equals solids-out." The volatile suspended solids level in a completely mixed basin thus can be expressed for the first basin as follows:

$$X_0 + a(So - Si) - bt_1 X = X_1$$

where additionally:

$X_0$ is the average volatile suspended solids entering the first basin
$a$ is the fraction of the volatile solids removed in the first basin
$b$ is the rate of auto-oxidation due to endogenous respiration The same formula may be rearranged as follows:

$$X_0 + a(So - Si) = X_1(1 + bt_1)$$

Substituting in the rearranged equation for $t_1$ the value for $X_1$ derived from the foregoing, the following equation results:

$$t_1 = \frac{(So - Si)(1 + bt_1)}{k Si (X_0 + a(So - Si))}$$

and by adding the rearranged equation for $t_2$ $$t_1 + t_2 = \frac{(So - Si)(1 + bt_1)}{k Si (X_0 + a(So - Si))} + \frac{Si - Se}{k Se X_2}$$

In the above equation, $t_1 + t_2$ is a function of $Si$ except for the last fraction. Inasmuch as $Se$ and $X_2$ are determined by the requirements of the process, and by inserting the several other process parameters for the other variables, a mathematical determination is possible to find whether a specific value of $Si$ exists whereby the resulting total detention time ($t_1 + t_2$) will be at a minimum for those parameters.

By employing the maximum/minimum criteria from differential calculus, the above equation may be differentiated and set to equal zero. Standard iterative methods will then provide four possible values for $Si$ to satisfy the equation which has been set to zero. The positive value between $Se$ and $So$ will indicate the value for $Si$ which should then be inserted in the originated separate equations for $t_1$ and $t_2$. The solution for $Si$ by standard iterative methods lends itself to solution by computer methods.

It must be pointed out that there are some cases where there is no unique value of $Si$ which will yield a combination of $t_1$ and $t_2$ so that their sum is at a minimum. Where there is no positive root for $Si$ which has a value between $Se$ and $Si$ an aerobic lagoon is indicated and some other design procedure is required. It is also possible that a positive root for $Si$ may be found having a value between $Se$ and $So$, but when this value of $Si$ is resubstituted into the equation for the rearranged value of $t_1$, it may be found that $t_1$ is a negative value. This negative value for $t_1$ indicates that it is impossible to obtain that desired intermediate BOD level ($Si$) with the selected process parameters. It is to be understood, of course, that the results obtained are only as reliable as the process input parameters which define the waste characteristics.

The following illustrative examples are derived from the above methods:

(1) Pulp and paper mill waste

Process parameters:
$a = 0.47$       $X_0 = 100$ mg./l.
$Se = 50$ mg./l.       $So = 400$ mg./l.
$k = 0.01$/day       $X_2 = 50$ mg./l.
$B = 0.20$ Results of iterative solution:

$Si = 85$ mg./l.
$t_1 = 2.1$ days
$t_2 = 1.4$ days
  3.5 days, total (2) Refinery wastes Process parameters:
$a = 0.53$       $X_0 = 25$ mg./l.
$Se = 50$ mgg./l.       $So = 300$ mg./l.
$k = 0.024$/day       $X_2 = 50$ mg./l.
$b = 0.25$ Results of iterative solution:
$Si = 67$ mg./l.
$t_1 = 1.3$ days
$t_2 = 1.0$ days
2.3 days, total (3) Domestic waste (without industrial waste sources)

Process parameters:
$a = 0.5$     $X_0 = 150$ mg./l.
$Se = 20$ mg./l.     $So = 200$ mg./l.
$k = 0.015$/day     $X_2 = 50$ mg./l.
$b = 0.22$ Results of iterative solution:
$Si = 39$ mg./l.
$t_1 = 1.5$ days
$t_2 = 1.3$ days
2.8 days, total The advantageous effect of the reduction of the total detention time upon the size and cost of the lagoons need not be explained. However, if an ordinary facultative lagoon is under consideration, it may well be thought that the additional power costs for the high rate aerobic first basin might offset the reduction in the cost of the basins, particularly having in mind that, as a rule of thumb, 1 H.P. is required per 1,000 gallons for high-rate aeration and complete mixing whereas 1 H.P. is required per 10,000 gallons for low-rate aeration and mixing as in the upper zone of a facultative lagoon. According to the invention, the power costs and the comparable cost of the aeration equipment actually diminishes as the detention time is reduced, except, however, that the minimum horsepower requirements for the two basins may increase as the minimum detention time is approached as shown, for example, in FIG. 2.

Figure 2:
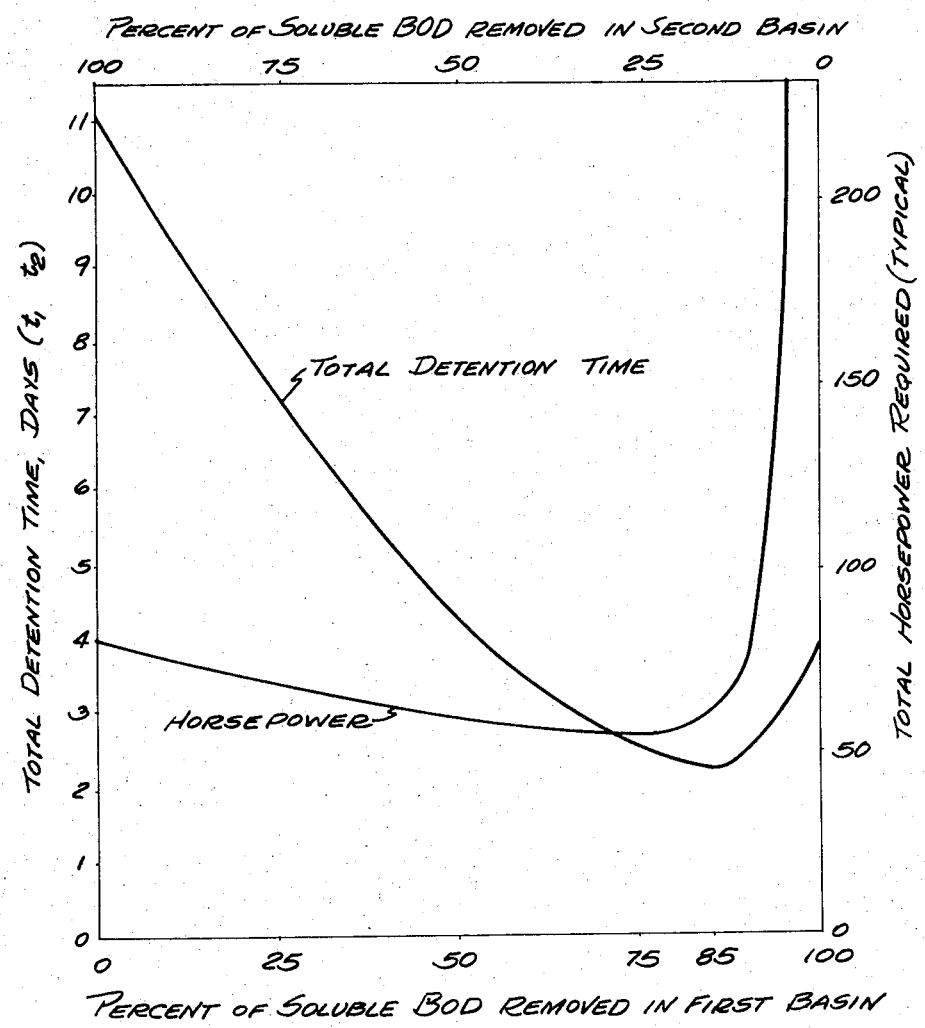
FIG. 2 is a graph with two curves. One curve shows the relationship of the total detention time required depending upon the amount of the removal of soluble BOD to be effected in the respective basins in terms of a percent of the total removal to be effected. The other curve shows the relative horsepower requirements which are typical for the different total detention times indicated.

The graph of FIG. 2 includes typical curves showing the relationship of different relative sizes of the two basins for a given flow of a selected waste. It will be seen that as the size of the first basin is increased (from zero or no first basin at the left) the required size of the second basin diminishes even faster. This is indicated in terms of the percent of total BOD removal to be effected in the first basin. At 75%, the horsepower requirements are at a minimum; at 85%, the detention time and total size of the basins are at a minimum but the horsepower requirements have increased. In the design of a lagooning system the relative costs of land and of the aeration equipment including its operation, will thus influence the exact selections of basin sizes and the amount of aeration to be provided.

In considering the design of the lagooning system it will appear that no consideration is given to the use of two basins operating so that, for example, 90% of the BOD is removed in the first basin. As will appear, the horsepower requirements rise steeply and as a practical matter, consideration must be given the fact that a very small facultative lagoon may not have enough "floor space" for the anaerobic decomposition of the settled solids.

However, the size of the first basin providing between 85% and 75% of the total BOD removal, in effect, does provide in effect the largest feasible if not largest possible fully-mixed aerobic first basin. The advantages of such a basin are well known and in particular, include maximum resistance of the microorganisms in the basin to shock loadings. In addition, this resistance to shock loadings is provided at all times without having to provide controls of return rates or the like.

I claim:

1. An organic waste treatment system comprising first and second basins connected in series, high level aeration and mixing apparatus in the first basin and low level aeration and mixing apparatus in the upper zone of the second basin, the lower zone of the second basin being of a depth to provide quiescent conditions for the formation of a bed of settled material and the maintenance of an anaerobic environment in its lowermost stratum, the size, depth and aeration apparatus of the upper zone providing gentle mixing of the intermediate "bioliquor" received from the first basin with the anaerobic decomposition products which rise from the lower zone, the two basins having relative detention times ($t_1$ and $t_2$) substantially in accordance with the following:

$$t_1 = \frac{(So-Si)(1+bt_1)}{kSi(X_0+a(So-Si))}$$

$$t_2 = \frac{Si-Se}{kSeX_2}$$

where $So$ is the given soluble BOD of the first basin influent; $Se$ is the allowable soluble BOD of the second basin effluent; $a$ is the known fraction of the volatile suspended solids to be removed in the first basin; $b$ is the known rate of auto-oxidation due to endogenous respiration in the first basin; $X_0$ is the given average volatile suspended solids entering the first basin; $X_2$ is the average volatile suspended solids desired in the second basin effluent; $k$ is the known soluble BOD removal rate coefficient for the waste; and where $Si$ is the soluble BOD level of the intermediate "bioliquor" and is selected to provide the sum of $t_1$ and $t_2$ with a minimum value whereby the system is of maximum capacity for its size considered in terms of total detention time.

2. The process of treating an organic waste which includes passing the waste through first and second basins connected in series, providing in the lower zone of the second basin relatively quiescent conditions for the formation of a bed of settled material and the maintenance of an anaerobic environment in its loweromst stratum, subjecting the waste to a high rate soluble BOD removal by aeration and complete mixing in the first basin for a given time $t_1$ and further soluble BOD removal by aeration and mixing in the upper zone of the second basin at a relatively lower rate for a given time $t_2$ substantially in accordance with the following equations:

$$t_1 = \frac{(So-Si)(1+bt_1)}{kSi(X_0+a(So-Si))}$$

$$t_2 = \frac{Si-Se}{kSeX_2}$$

where $So$ is the given soluble BOD of the first basin influent; $Se$ is the allowable soluble BOD of the second basin effluent; $a$ is the known fraction of the volatile suspended solids to be removed in the first basin; $b$ is the known rate of auto-oxidation due to endogenous respiration in the first basin; $X_0$ is the given average volatile suspended solids entering the first basin; $X_2$ is the average volatile suspended solids desired in the second basin effluent; $k$ is the known soluble BOD removal rate coefficient for the waste; and where $Si$ is the soluble BOD level of the intermediate "bioliquor" and is selected to provide the sum of $t_1$ and $t_2$ with a minimum value whereby the process operates at maximum efficiency considered in terms of the total detention time in the two basins.

References Cited

UNITED STATES PATENTS 3,234,123    2/1966    Hinde _____ 210—7

OTHER REFERENCES

Oswald, W. J.: Fundamental Factors in Stabilization Pond Design, appearing in biological waste treatment, 1963, edited by Ecken-Felder, W. W., et al., MacMillan Co., N.Y., pp. 357–393 (P.O.S.L.).

MICHAEL ROGERS, Primary Examiner

U.S. Cl. X.R.

210—16, 219, 252